United States Patent [19]

Oyamoto et al.

[11] Patent Number: 4,702,818
[45] Date of Patent: Oct. 27, 1987

[54] PROCESS FOR RECOVERING HEAT OF A TAR-CONTAINING HIGH-TEMPERATURE GAS

[75] Inventors: Toshiya Oyamoto; Katsuaki Makino, both of Hiroshima; Fumio Ogawara, Fukayasu, all of Japan

[73] Assignees: Mitsubishi Jukogyo Kabushiki Kaisha; Nippon Kokan, both of Tokyo, Japan

[21] Appl. No.: 675,069

[22] Filed: Nov. 26, 1984

[30] Foreign Application Priority Data

Nov. 28, 1983 [JP] Japan .................. 58-222170

[51] Int. Cl.$^4$ .................. F28D 7/00; F28D 13/00; F22B 1/18; F27D 17/00
[52] U.S. Cl. .................. 208/81; 165/104.16; 208/48 R; 208/48 Q; 208/100; 208/101; 585/910
[58] Field of Search ............. 208/48 Q, 48 R, 127, 208/81, 100, 101; 165/104.16; 422/146; 585/910

[56] References Cited

U.S. PATENT DOCUMENTS

| | | | |
|---|---|---|---|
| 2,475,255 | 7/1949 | Rollman | 165/104.16 |
| 2,541,693 | 2/1951 | Frevel et al. | 208/48 Q |
| 3,264,751 | 8/1966 | McEntee, Jr. | 422/146 |
| 3,593,968 | 7/1971 | Geddes | 208/48 Q |
| 3,717,438 | 2/1973 | Schmalfeld et al. | 422/146 |
| 3,718,708 | 2/1973 | Ozawa et al. | 208/48 Q |
| 4,150,716 | 4/1979 | Ozaki et al. | 208/48 Q |
| 4,220,193 | 9/1980 | Klaren | 165/104.16 |
| 4,279,733 | 7/1981 | Gwyn | 208/48 Q |
| 4,351,275 | 9/1982 | Bhojwani et al. | 208/48 Q |
| 4,426,359 | 1/1984 | Woebcke et al. | 208/48 Q |
| 4,446,003 | 5/1984 | Burton et al. | 208/48 Q |
| 4,557,904 | 12/1985 | Brod et al. | 422/146 |

FOREIGN PATENT DOCUMENTS

| | | | |
|---|---|---|---|
| 0095183 | 6/1983 | Japan | 165/104.16 |
| 0881516 | 11/1981 | U.S.S.R. | 165/104.16 |

*Primary Examiner*—John Doll
*Assistant Examiner*—Jeffrey Edwin Russel
*Attorney, Agent, or Firm*—Wenderoth, Lind & Ponack

[57] ABSTRACT

A process for recovering heat from a tar-containing gas while simultaneously cooling the gas in a 3-stage cooling step by (1) directing a tar-containing gas through a jet cooler comprising a bed of solid particles so that the gas contacts the solid particles and forms a fluidized bed with the flow of the tar-containing gas, which jet cooler comprises a central draft tube into which the gas is directed and indirect heat exchange lines containing a liquid coolant therein disposed inside the central draft tube and wherein the gas and solid particles are cooled by such indirect heat exchange lines such that the tar from the gas condenses on the solid particles; (2) directing the gas through a tar cooler in the second stage wherein the gas-containing residual tars and other impurities resulting from the treatment in the jet cooler are sprayed with a circulating tar from a nozzle to remove a residual tars and impurities from the gas and wherein the gas is further cooled in said tar cooler by means of an indirect heat exchange unit containing a liquid coolant therein; and (3) further cooling the gas by introducing the thus-treated gas into an indirect heat exchange unit wherein the gas is further cooled with lines carrying a liquid cooling medium and the gas finally sprayed with a light-gravity tar to remove the remainder of tar and other impurities from the gas. By the aforementioned method, heat is recovered from the gas by the liquid coolants, etc., used in the cooling stages.

4 Claims, 5 Drawing Figures

PROCESS FOR RECOVERING HEAT OF A TAR-CONTAINING HIGH-TEMPERATURE GAS

BACKGROUND OF THE INVENTION

1. Field of the Invention

The present invention relates to a process for recovering heat from a tar-containing high-temperature gas. More particularly, the invention relates to a process for recovering the heat from a tar-containing high-temperature gas generated by treating at high temperatures a fossil fuel such as crude gas generated in a coke oven, a gas generated by the thermal decomposition of coal and a gas generated by the combustion under reduced pressure of a residual oil.

2. State of the Art

Heretofore, a crude gas generated in a coke oven has been cooled by flashing ammonia water thereinto and thereafter the cooled gas is transferred by a gas refining step, whereby the sensible heat of said gas is not utilized.

In view of the above, attempts have been made to introduce a crude oil generated in a coke oven to a shell and a tube heat exchanger in an effort to recover its sensible heat. However, such crude oil generated in a coke oven contains low boiling point substances such as benzoles, high boiling point substances like tar and soluble substances like naphthalene. Therefore, at temperatures more than 450° C., carbon is produced by the high temperature decomposition of tar-precipitates on the surface of the heat transfer tube in the heat exchanger, while at temperatures of 450° C. and below, the high boiling point substances, like tar, condense on the surface of the heat transfer tube. At temperatures not more than 100° C., the soluble substances like naphthalene condense on the heat transfer tube. As a result, these carbon and condensates thus-produced block the gas passageways in the shell and tube heat exchanger, causing the so-called coking phenomenon, thereby making it difficult to operate the heat-recovering equipment under stable conditions for a long period of time due to the clogging of the equipment and the decreased gas flow and the overall lowered heat exchange efficiency.

Attempts have also been made to spray the crude gas generated in a coke oven with a high boiling point oil such as tar distilled from a crude gas generated in a coke oven in an effort to bring the tar and crude gas into direct contact with each other to recover the sensible heat of the crude gas by the exchange of heat between the crude gas and tar. However, crude gas generated in a coke-oven contains naphthalene and other soluble substances as well as dust and these materials mix and accumulate in the high boiling point oil, such as tar, and the mixture blocks the high boiling point oil spray nozzle used in such spraying systems. This clogs the circulating system and serves to decompose and deteriorate the high boiling point oil, which makes it difficult to operate such a system for any reasonable length of time under stable conditions.

SUMMARY OF THE INVENTION

The present invention has been invented in an effort to solve the foregoing difficulties of the prior art.

It is an object of the present invention to improve the efficiency of recovering the sensible heat from the high-temperature gas containing a high-boiling point substance such as tar, naphthalene, and other soluble substances as well as dust.

It is another object of the present invention to recover the sensible heat of said high-temperature gas in a high temperature range to thereby improve the scope and efficiency of such heat-recovery process.

It is still another object of the present invention to improve the process conditions in such heat-recovery process so as to enable the equipment to be operated over a long period of time under stable conditions.

It is another object of the present invention to improve the operating conditions such as to render a tar cooler used in the process more compact and efficient, and at the same time to reduce the amount of power needed to drive the tar circulation pump in said tar cooler.

The above is accomplished by passing a tar-containing gas through three stages to cool the gas and recover the sensible heat from the gas as follows: (1) the gas is directed through a jet cooler comprising a bed of solid particles so that the gas contacts the solid particles and forms a fluidized bed with the flow of the tar-containing gas, which jet cooler comprises a central draft tube into which the gas is directed and indirect heat exchange lines containing a liquid coolant therein disposed outside the central draft tube and wherein the gas and solid particles are cooled by said indirect heat exchange lines, such that the tar from the gas condenses on said solid particles; (2) the gas then is directed through a tar cooler wherein the gas-containing residual tars and other impurities resulting from the treatment in the jet cooler are sprayed with a circulating tar from a nozzle to remove residual tars and impurities from the gas and wherein the gas is cooled in said tar cooler by means of an indirect heat exchange unit containing a liquid coolant therein located within the tar cooler and (3) the gas is directed into an indirect heat exchange unit wherein the gas is further cooled with lines carrying a liquid cooling medium and the gas finely sprayed with a light gravity tar to remove the remainder of tar and other impurities from the gas. Further, tar condensed in the indirect contact type heat exchanger is fed back to the tar cooler to spray the gas introduced into said tar cooler. By the aforementioned process, heat is recovered from the gas by the heat exchange mediums, etc. circulating in the jet layer cooler, the tar cooler and the indirect heat exchanger.

Other advantages and features of the present invention will become apparent from the following drawings showing one embodiment of the present invention and an explanation thereof.

DETAILED DESCRIPTION OF THE INVENTION

Figure 1:
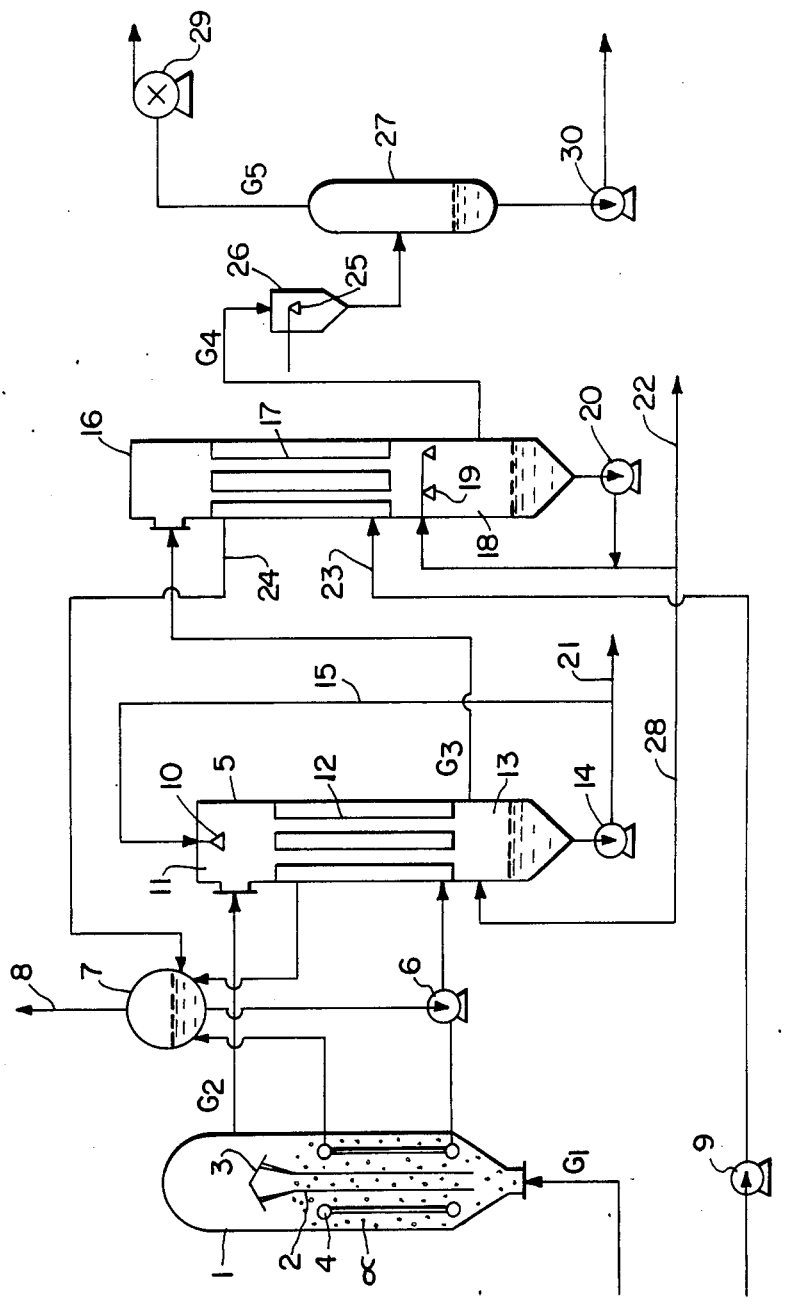
FIG. 1 is a schematic flow diagram showing one embodiment of the present invention.

FIG. 1 is a schematic flow diagram of one embodiment of the present invention. In this embodiment, a high temperature (about 600°-800° C.) crude gas $G_1$ generated in a coke oven is introduced into a jet layer cooler (1) from an inlet nozzle thereof. While said gas accompanied by solid particles ($\alpha$) is ascending inside a draft pipe (2), the heat from said gas is imparted to said solid particles ($\alpha$), and at the same time, tar and pitch contained in said gas is condensed on the surfaces of said particles ($\alpha$). Said gas, while ascending in said draft pipe (2), collides with a collision plate (3), thereby being separated from said solid particles ($\alpha$). Further, the solid particles ($\alpha$), having collided with said collision plate (3), imparts heat to a liquid heat medium, namely, water in this embodiment flowing inside a heat transfer tube (4), whereby the solid particles ($\alpha$) are cooled while descending along the periphery of said heat transfer tube (4). At the same time, said tar and pitch having condensed on the outer surfaces of said solid particles ($\alpha$) are carbonized to carbon powder and peel off the solid particles due to interparticulate collision of the solid particles ($\alpha$).

The solid particles ($\alpha$), having given heat to the water coolant, are cooled, and again the particles ($\alpha$) come into contact with the gas $G_1$ flowing in from an inlet nozzle, whereby the gas and solid particles flow upward inside said draft pipe (2), repeating the cooling operation discussed above. The gas, now called $G_2$, having been cooled to about 400°-500° C. inside said jet layer cooler (1) accompanied by carbon powder is then introduced into a gas-liquid contact chamber (11) on the upper portion of a wetted wall type tar cooler (5), where it comes into contact with circulating tar sprayed from a spray nozzle (10), thus imparting heat to the tar. At the same time, said carbon powder and droplets of cooled and condensed tar and pitch in said gas are adsorbed and collected by said circulating tar. The circulating tar, having become a thin liquid film, then descends along the inner surface of a vertical type heat transfer tube (12), where it gives heat to water located outside the vertical type heat transfer tube (12). The gas then enters a gas-liquid separation chamber (13), where the gas is separated from the circulating tar, and become the gas $G_3$ flowing out of the tar cooler (5) at a temperature of about 200°-300° C.

The tar separated in the gas-liquid separation chamber (13) is extracted by a tar circulation pump (14) and a greater part of the extracted tar is circulated to the spray nozzle (10) via a tar circulation pipe (15), while the rest of the extracted tar is extracted to the outside of the system by a tar extract pipe (21).

The gas $G_3$, which flows out of the tar cooler (5), is introduced to the upper inlet chamber of an indirect contact type heat exchanger (16) and the gas descends in a vertical type heat transfer tube (17) of said heat exchanger, it imparts heat to water flowing outside the heat transfer tube (17), whereby the gas is further cooled and thereafter the gas is directed to a lower outlet chamber (18), wherein tar in the gas is condensed by being cooled with another light-gravity tar sprayed from a nozzle (19) to separate the tar therefrom. Thereafter the gas $G_4$ flows out of the heat exchanger at a temperature of 80°-120° C.

The light-gravity low boiling point tar separated in the lower outlet chamber (18) of the heat exchanger (16) is extracted by a tar pump (20). A part of the extracted light-gravity tar is fed to said nozzle (19) and recirculated, but another part of said light-gravity tar is fed back to the separation chamber (13) of the tar cooler (5) as dilute tar via a dilute tar feed pipe (28), while the remaining surplus is extracted to the outside of the system by an extract pipe (22).

The gas $G_4$ having flowed out from the indirect contact type heat exchanger (16) is introduces as a gas-liquid contact vessel (26), where it contacts water sprayed from a nozzle (25), thereby being cooled. Thereafter, the thus-cooled gas is directed to a gas-liquid separation vessel (27), where it is separated from water droplets and the gas now called $G_5$ is discharged via an exhauster (29).

The water separated in the gas-liquid separation vessel (27) is extracted by a pump (30) and discharged. When water fed by a feed pump (9) passes outside the vertical type heat transfer tube (17) of the indirect contact type heat exchanger (16) via piping (23), it is heated by the gas passing through the heat transfer tube (17) and thereafter fed to a steam drum (7) via piping (24). The water separated from steam inside the steam drum (7) is extracted by a pump (6). A part of the extracted water removes heat from the solid particles ($\alpha$) outside the heat transfer tube (4), thereby being heated as the water passes through inside the heat transfer tube (4) of the jet layer cooler (1) and returns to the steam drum (7). The rest of the water extracted by the pump (6) is introduced to the vertical type heat transfer tube (12) of the tar cooler (5), exchanging heat with the gas passing through the heat transfer tube (12), whereby it is heated and thereafter returned to the steam drum (7). The water having returned to the steam drum (7) evaporates as the pressure inside the steam drum is kept below the saturated pressure and steam is supplied to the user via a steam pipe (8).

The advantages of the present invention will now be explained with reference to FIG. 1.

According to the present invention, crude gas $G_1$ generated in a coke oven at about 600°-1000° C. is first forwarded to the jet layer cooler (1) where it is cooled to about 400°-500° C. Therefore, high boiling point substances like tar in the gas condense on the surfaces of the solid particles ($\alpha$). These condensed substances carbonize when the solid particles ($\alpha$) descend and, further, peel off due to the interparticulate collision of the solid particles ($\alpha$). As a result, the condensates or carbides of these high boiling point substances do not adhere to the heat transfer tube (4) to impair the heat exchange efficiency and the solid particles ($\alpha$) are automatically regenerated. Therefore, these solid particles may be used in recirculation. However, when the gas is over-cooled by the jet layer cooler (1), the amount of condensed tar increases and the diameters of the solid particles ($\alpha$) also increase or the solid particles ($\alpha$) condense. Therefore, it is appropriate that the cooling temperature of the gas is more than 450° C.

In respect to the gases cooled to about 400°-500° C. by the jet layer cooler (1) and introduced into the tar cooler (5), even if the tar and pitch contained in the gas condense in the tar cooler (5), they may be washed away by a large amount of circulating tar to keep the condensed tar and pitch from coking the tar cooler (5). Moreover, the circulating tar which is fed with and contains light-gravity low boiling point tar condensed by the indirect contact type heat exchanger (16) is such as to possess a low viscosity, and thus its cooling properties are improved and the driving power of the tar pump (14) may be reduced. Tar contained in the crude gas generated in a coke oven begins to condense at 425° C. and the tar condensation ratio reaches about 50% at 200° C. in the tar cooler (5).

To the indirect contact type heat exchanger (16), the gas G₃ cooled to 200°-300° C. by the tar cooler (5) is introduced, and in this temperature range, coking of the heat transfer tube and sticking of the tar to the heat transfer tube no longer occurs. By cooling the gas G₃ at 200°-300° C. to 80°-120° C. by the heat exchanger (16), heat may be recovered by preheating the heat medium to be fed to the jet layer cooler (1) and the tar cooler (5) with the heat of the gas corresponding to the temperature difference in this low temperature range.

Figure 2:
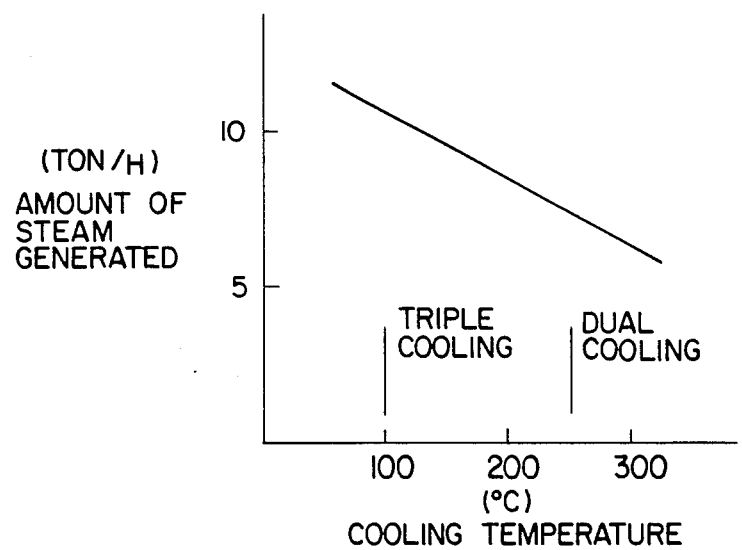
FIG. 2 is a graph showing the relationship between the cooling temperature and the amount of steam generated.

The relationship between the amount of steam generated and the cooling temperature is shown in FIG. 2 when 30,000 Nm³/H of a crude gas is 600° C. (generated in a coke oven) is processed. As shown in FIG. 2, the amount of steam recovered when the gas is cooled to 350° C. by the dual cooling operation of the jet layer cooler (1) and the tar cooler (5) is 7.3 TON/H, whereas the amount of steam recovered is 10 TON/H when the gas at 250° C. is further cooled to 100° C. by the additional use of the indirect contact type heat exchanger, i.e., the amount jumps by 45%.

Figure 3:
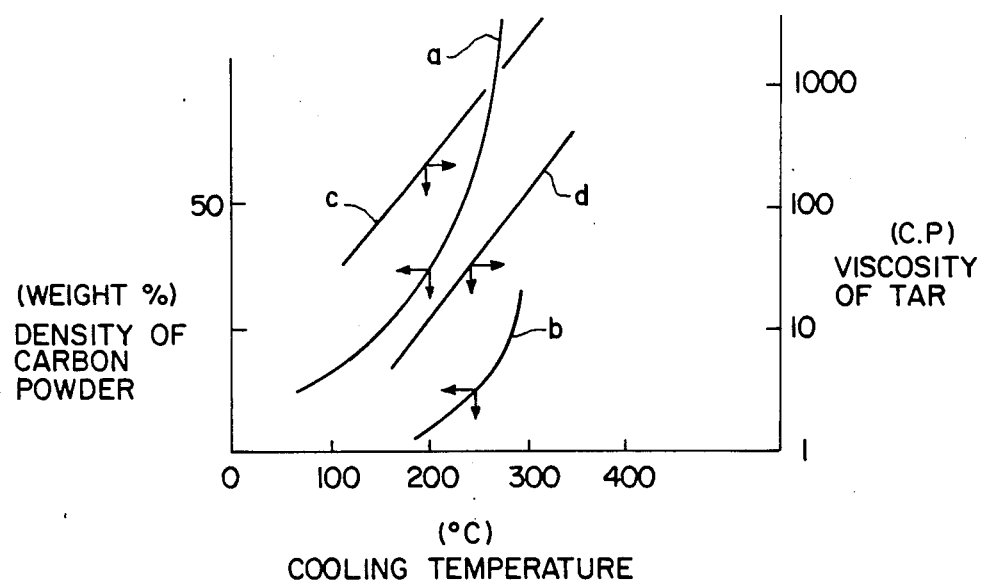
FIG. 3 is a graph showing the relationship of the cooling temperature, the density of carbon powder and the viscosity of tar in the tar cooler.

In FIG. 3, the relationship of the cooling temperature, the viscosity of the tar and the density of carbon powder in the tar cooler (5) is shown. From FIG. 2, it is evident that as compared with the density of carbon powder when a dilute tar is not used, the density of carbon powder b when dilute tar is used is far lower. Further, as compared with the viscosity of tar c when dilute tar is not fed into the system, the viscosity of tar d, when dilute tar is fed into the system, is sharply lowered.

Figure 4:
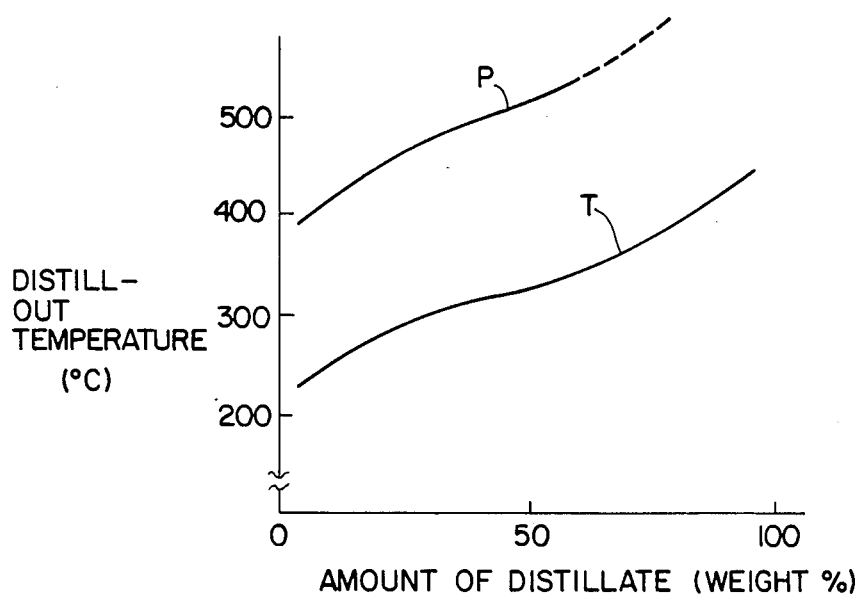
FIG. 4 is a graph showing the relationship between the distill-out temperature and the amount of distillate.

In FIG. 4, there is shown a relationship between the distill-out temperature and the amount of distillate, wherein T is the distillation curve in the extract pipe (22) when the gas temperature at the outlet of the indirect contact type heat exchanger (16) is kept at 80° C. during the operation of the recovery equipment and P is the distillation curve in the extract pipe (21) when the gas temperature at the outlet of the tar cooler (5) is kept at 250° C. during the same operation. As will be apparent from FIG. 4, it is clear that the distillate is recovered in two separate parts, one distillate at more than 400° C., and another distillate at not more than 400° C.

Figure 5:
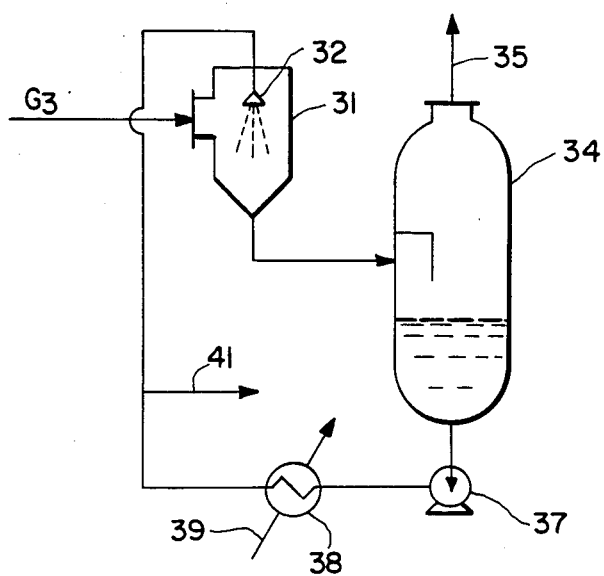
FIG. 5 is a schematic flow diagram showing another embodiment of the tar cooler.

In the above embodiment, the explanation represents the case wherein a wetted wall type heat exchanger is adopted as the tar cooler, however, it is possible to use as the tar cooler a tar quencher having a gas-liquid contact segment where tar is fed by spraying and the tar cooling segment provided in a tar circulation passage as shown in FIG. 5.

In FIG. 5, a gas G₃ fed from the jet layer cooler (1) enters a gas-liquid contacter (31), where the gas contacts droplets of circulating tar sprayed from a spray nozzle (32) and is cooled. Thereafter, the gas enters a gas-liquid separation vessel (34), where droplets of the tar in the gas are removed. The gas is then forwarded to the indirect contact type heat exchanger (38) from an outlet (35). The tar separated in the gas-liquid separation vessel (34) is extracted by a pump (37) and is forwarded to the heat exchanger (38), where the heat in the gas is transferred to a liquid heat medium (39) (water) and cooled. Thereafter, the gas is sprayed by the spray nozzle (32) of the gas-liquid contacter (32). A part of the sprayed tar is extracted from an extract pipe (41). The water heated by the heat exchanger (38) is fed to the steam drum.

In the foregoing embodiment, water is used as the heat medium, but, needless to say, heat resisting oils and other liquid heat media may be used as the heat medium.

In the foregoing, the present invention is explained by way of one embodiment, but the present invention is not limited to this embodiment, That is, various modifications or changes of design are possible without departing from the gist of the present invention.

What is claimed is:

1. A process for recovering heat from a tar-containing gas and simultaneous cooling the gas, which comprises (1) directing a tar-containing gas at a temperature of about 600°-800° C. through a jet cooler comprised of a bed of solid particles so that the gas contacts the solid particles and forms a fluidized bed with the flow of the tar-containing gas, said jet cooler comprising a central draft tube into which the gas is directed and indirect heat exchange lines containing a liquid coolant therein being disposed outside the central draft tube and wherein the gas and solid particles are cooled by said indirect heat exchange lines to a temperature of about 400°-500° C., such that the tar from the gas condenses on said solid particles; (2) directing the gas through a tar cooler wherein the gas-containing residual tars and other impurities resulting from the treatment in the jet cooler are sprayed with a circulating tar from a nozzle to remove residual tars and impurities from the gas and wherein the gas is cooled in said tar cooler to a temperature of about 200°-300° C. by means of an indirect heat exchange unit containing a liquid coolant therein located within the tar cooler; and (3) further directing the thus-treated gas into an indirect heat exchange unit wherein the gas is further cooled to a temperature of about 80°-120° C. with lines carrying a liquid cooling medium and the gas finally sprayed with a light gravity tar to remove the remainder of tar and other impurities from the gas.

2. A process for recovering heat according to claim 1, wherein a liquid medium for cooling is at first directed through said indirect heat exchanger and then passed through said jet layer cooler and said tar cooler to thereby raise the temperature of the liquid medium and to recover the heat.

3. A process for recovering heat according to claim 1, wherein a part of tar condensed by said indirect heat exchanger is returned to said tar cooler to be used as a diluent.

4. A process according to claim 1, wherein said jet layer cooler comprises a draft tube installed at the internal center of said jet layer cooler for upwardly jetting the solid particles; an impact plate integrally constructed with said draft tube at the upper end thereof for separating said solid particles from the gas; and a group of cooling pipes installed vertically around said draft tube for imparting heat to the liquid coolant medium flowing therein.

* * * * *